No. 669,804. Patented Mar. 12, 1901.
C. A. PARSONS & A. D. WASS.
PROPELLER SHAFT SUPPORT.
(Application filed Dec. 22, 1900.)

(No Model.) 4 Sheets—Sheet 1.

Attest
Walter Donaldson
Edw. L. Reed.

Inventor
Charles Algernon Parsons
Archibald Douglas Wass
by their Atty.

No. 669,804. Patented Mar. 12, 1901.
C. A. PARSONS & A. D. WASS.
PROPELLER SHAFT SUPPORT.
(Application filed Dec. 22, 1900.)

(No Model.) 4 Sheets—Sheet 2.

No. 669,804. Patented Mar. 12, 1901.
C. A. PARSONS & A. D. WASS.
PROPELLER SHAFT SUPPORT.
(Application filed Dec. 22, 1900.)
(No Model.) 4 Sheets—Sheet 3.
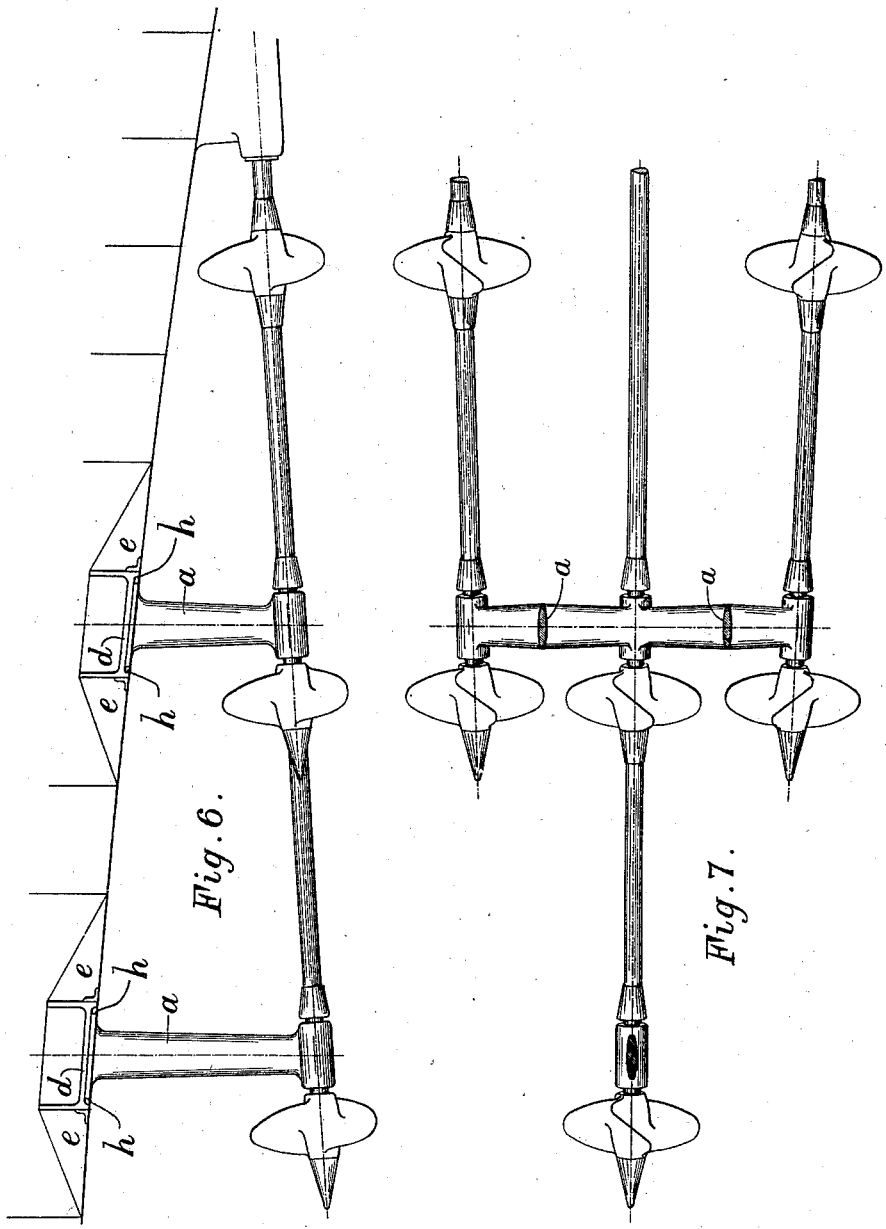

No. 669,804. Patented Mar. 12, 1901.
C. A. PARSONS & A. D. WASS.
PROPELLER SHAFT SUPPORT.
(Application filed Dec. 22, 1900.)
(No Model.) 4 Sheets—Sheet 4.
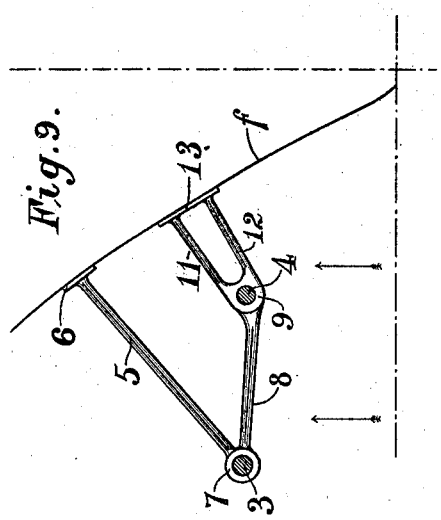
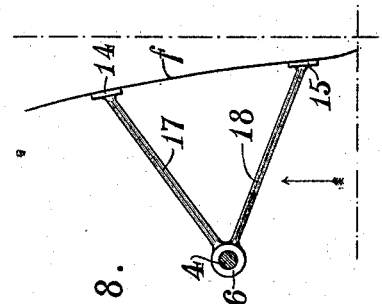
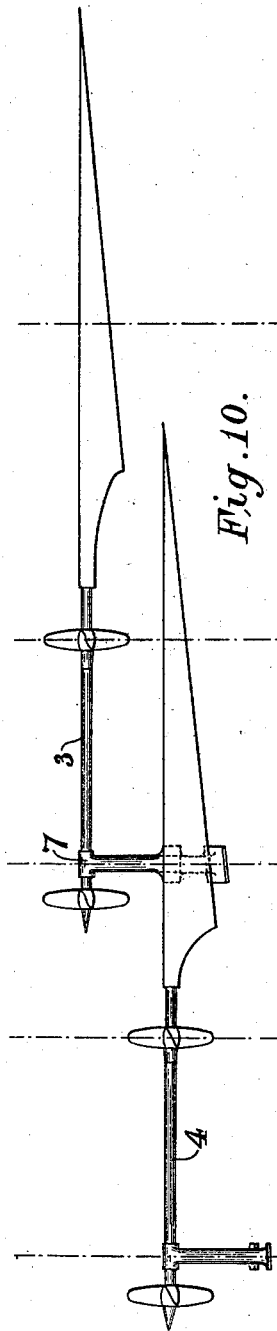
Attest
Walter Donaldson
Edw. L. Reed.
Inventors
Charles Algernon Parsons
Archibald Douglas Wass
by Ellis Spear
Atty.

UNITED STATES PATENT OFFICE.

CHARLES ALGERNON PARSONS AND ARCHIBALD DOUGLAS WASS, OF NEW-CASTLE-UPON-TYNE, ENGLAND.

PROPELLER-SHAFT SUPPORT.

SPECIFICATION forming part of Letters Patent No. 669,804, dated March 12, 1901.

Application filed December 22, 1900. Serial No. 40,771. (No model.)

*To all whom it may concern:*

Be it known that we, CHARLES ALGERNON PARSONS and ARCHIBALD DOUGLAS WASS, subjects of the Queen of Great Britain and Ireland, and residents of Heaton Works, Newcastle-upon-Tyne, in the county of Northumberland, England, have invented certain new and useful Improvements in Propeller-Shaft Supports, (for which we have made application for patent in Great Britain, No. 9,462, and bearing date May 22, 1900,) of which the following is a specification.

Our invention relates to the forming and attaching of struts or brackets for the support of propeller-shafting in vessels using two or more propeller-shafts; and it is specially applicable in vessels of the torpedo boat or destroyer class where two or more propellers are placed on each shaft.

The objects of our invention are, first, to reduce the resistance of the propeller-shaft struts or brackets, and, second, to render them easily removable for change of the propellers, while insuring their accurate replacement and fixing without need for skilled labor in lining up and setting.

The first part of our invention consists in the formation of the struts or brackets with special palms or soles, by means of which they can be rapidly secured or centered on special sole-plates permanently attached internally to the framing and plates of the vessel.

The second part of our invention consists in a special form of compound bracket or strut for the support of the multiple shafts, with one or more propellers on each shaft, such that a suitable reduction in the resistance offered by these struts to the propulsion of the vessel is effected.

The third part of our invention consists in a special form of supporting-bracket, which we find it advantageous to apply to vessels where the ordinary lines of a fast vessel have to be adhered to.

Figure 1:
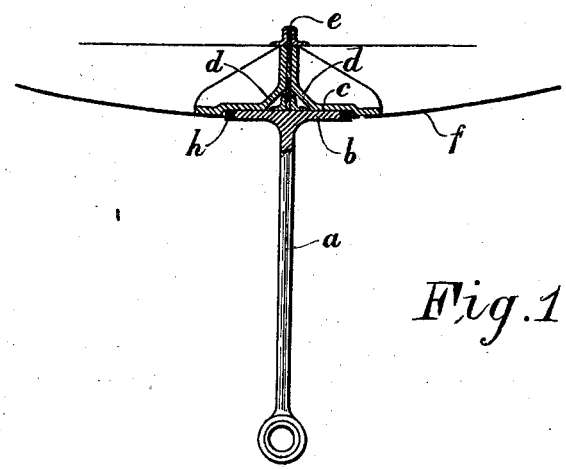
Figure 2:
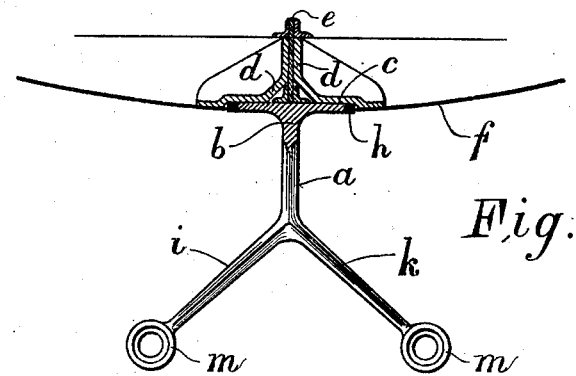
Figure 3:
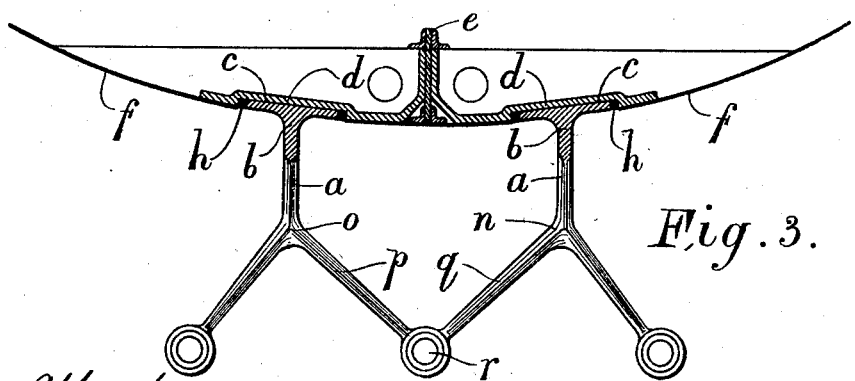
Figure 5:
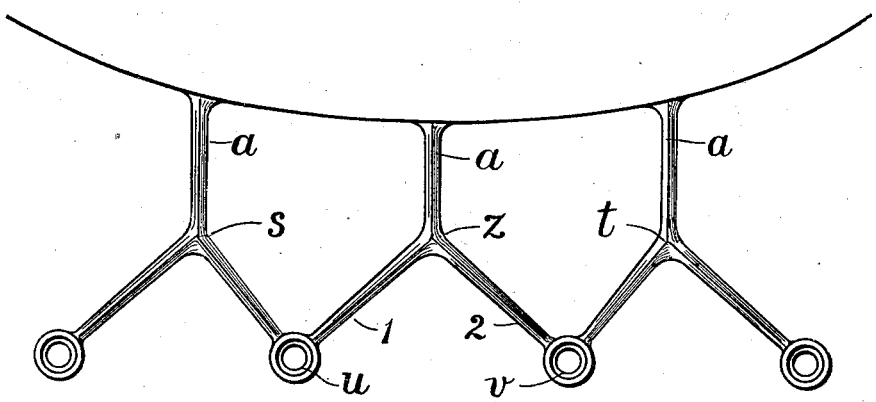
Figure 4:
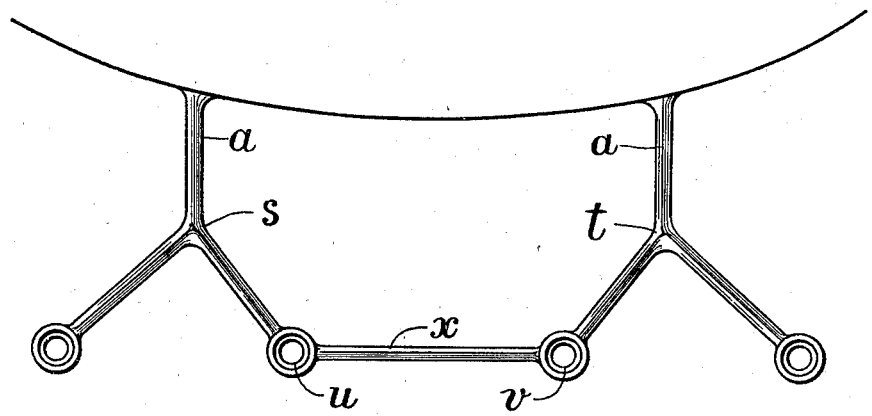

In the accompanying four sheets of drawings, Figures 1, 2, and 3 are sectional elevations of brackets for supporting, respectively, one, two, and three propeller-shafts, showing their soles and internal sole-plates. Figs. 4 and 5 are elevations of brackets for supporting four propeller-shafts. Figs. 6 and 7 are respectively elevation and plan of three propeller-shafts, showing an arrangement of brackets and propellers embodying the constructions illustrated in Figs. 1 to 3. Figs. 8 and 9 are side elevations of two brackets for supporting the propeller-shafting where the ordinary lines of a fast vessel have to be adhered to. Fig. 10 is a plan of a portion of a fast vessel with ordinary lines, looking from the bottom in the direction of the arrows in Figs. 8 and 9, showing the ends of the two starboard propeller-shafts and the brackets for supporting them.

Referring to Figs. 1, 2, 3, and 6, which illustrate the first part of our invention, $a$ is a strut or bracket provided with a palm or sole $b$, the upper face $c$ of which is carefully machined and suitably arranged for being secured by bolts or other means directly to internal sole-plates $d$, permanently attached to the framing and plates $f$ of the vessel, so that these struts $a$ and the propellers which they support may be easily removed and replaced. The internal sole-plates $d$ we form, preferably, of cast-steel with truly-planed surfaces or machined sockets for the reception of the strut or bracket sole $b$. The plating $f$ of the vessel is cut away to allow these machined bracket-soles $b$ to be fitted against the machined surfaces of the internal sole-plates $d$. This attachment of the propeller-shaft struts or brackets direct to an internal sole-plate enables the brackets to be readily removed and also readily and accurately replaced practically without skilled labor or special precautions. It also enables the brackets to be marked off when in place in the vessel and removed and machined in the shop, thus avoiding the usual slow and expensive practice of boring them out in place on the ship. rear portion of the gear-frame a suitable distance above said axle for the introduction of If the struts $a$ are formed of aluminium-bronze, manganese-bronze, or gun-metal, we provide a suitable space around their junctions with the sole-plates for the reception of the usual zinc liner or ring $h$ to prevent corrosion.

The second part of our invention is illustrated by Figs. 1 to 7, inclusive, and in carrying it into effect we place the propellers abreast of each other, Fig. 7, so as to allow of a simplification of the supporting-struts and a reduction of their resistance to propulsion through the water. The struts we make then of a peculiar branching and interlocking form to secure rigidity and strength, with a minimum of edge and surface resistance.

Fig. 2 illustrates brackets for a two-shaft vessel. They take a symmetrical three-branch-star form in end elevation of the vessel. The upper branch $a$ carries the palm or sole $b$ for attachment to the vessel. The two lower branches $i$ and $k$ carry bosses or journals $m\ m$, adapted to support the propeller-shafts. The branches of this star-shaped bracket should have a very flat elliptical section, (see section $a$, Fig. 7,) and the line joining their edges or their longer axes should lie in the direction of motion. This form of bracket replaces two of the A-brackets usually employed and offers much less edge and surface resistance than such brackets.

Where three propeller-shafts are used, we make the supporting struts or brackets of a double star $o$ and $n$, as illustrated in Fig. 3. In this case each part of the bracket is similar to the bracket above described; but the adjoining arms $p$ and $q$ unite in a common boss or bearing $r$, which supports the propeller-shaft. The end of the central propeller-shaft, which shaft is generally made longer than the two side ones, as seen in Figs. 6 and 7, is supported by a single straight bracket, Fig. 1, carrying a suitable bearing for the shaft.

Where four propeller-shafts have to be supported, we provide two star-shaped brackets $s$ and $t$, similar to those described for supporting two propeller-shafts; but we connect their inner bosses $u$ and $v$ by a cross member $x$, Fig. 4, of the same section as the arms of the bracket. This cross member gives additional stiffness to the structure.

As a modification of the arrangement last described instead of the cross member $x$ we may provide a third star-shaped bracket $z$, Fig. 5, having its lower ends 1 and 2 formed with or attached to the bearings $u$ and $v$ for the two center shafts. This compound bracket is thus formed of three stars $s$, $z$, and $t$, having three arms each, the upper arms $a$ of each set being attached to the vessel preferably by the means described above. The bearings for these brackets we construct in the usual manner with bushes fitted with lignum-vitæ strips or with white metal.

The hereinbefore-described brackets are especially intended for fast vessels, the under bodies of which are flattened in form and inclined upward toward the stern. When the ordinary lines of a fast vessel have to be adhered to, we use four propeller-shafts, which are arranged practically at the same level on the vessel. In such a vessel the outermost propeller-shaft 3, Fig. 10, which shows the ends of two propeller-shafts and their shields, will generally be shorter, as it emerges from the side of the vessel at a point nearer the bow of the vessel. Where the two shafts 3 and 4 have to be supported together from the side of the vessel, especially at the outer end bearing of the outside shaft, we provide a special compound bracket having four members. Fig. 9 illustrates one form of this bracket. A member 5 is fastened to the side of the vessel at one end 6 and passes out at right angles to the ship's plating $f$ to the outer shaft 3, where it is provided with a bearing 7 for supporting the said shaft. The second member 8 joins this outermost bearing 7 to a corresponding bearing or boss 9, carrying the inner shaft 4. United to this bearing 9 is a support composed of two limbs 11 and 12, which lie parallel to each other and practically at right angles to the ship's plating, to which they are secured by means of a common sole 13. The attachment of the bracket to the ship's plating is effected in a similar manner to all the forms of bracket described above.

For supporting the end of the inner propeller-shaft 4 we employ the form of bracket illustrated in Fig. 8, consisting of two limbs uniting at their outer extremities in a bearing for the shaft and provided at their inner extremities with soles for attachment to sole-plates fixed to the ship's plating, as in the modifications already described.

Having now described our invention, what we claim as new, and desire to secure by Letters Patent, is—

1. A detachable fastening for propeller-shaft-supporting brackets consisting of soles formed upon said brackets in combination with sole-plates permanently secured to the plating of the ship, substantially as described.

2. Propeller-shaft supports consisting of three-membered star-shaped brackets, having soles upon the upper vertical member or members for detachably securing said brackets to sole-plates permanently fastened to the plating of the ship, the lower members carrying the bearings for the propeller-shafts, substantially as described.

3. Propeller-shaft supports consisting of three-membered star-shaped brackets formed of flat elliptical section and having soles upon the upper vertical member or members for detachably securing said brackets to plates permanently fastened to the plating of the ship, the lower members carrying the bearings for the propeller-shafts, substantially as described.

4. Supports for multiple propeller-shafts, composed of three-membered star-shaped brackets, soles upon the upper vertical members for securing said brackets to sole-plates permanently fastened to the ship's plating, the outer and intermediate lower members carrying bearings for the propeller-shafts, horizontal members uniting adjacent lower members, substantially as described.

5. A propeller-shaft support consisting of an A-shaped bracket the members of which are of flat elliptical section, soles on the free extremities of said members, in combination with sole-plates permanently fastened to the plating of the ship, substantially as described.

6. In vessels having the ordinary lines of a fast vessel and using multiple propeller-shafts with one or more propellers on each shaft, a shaft-supporting bracket constructed of two standards having sole-plates at one extremity for detachably securing said bracket to the plating of the ship and their other extremities formed with bearings for the propeller-shafts said bearings connected by a cross member substantially as described.

In witness whereof we have hereunto set our hands in presence of two witnesses.

CHARLES ALGERNON PARSONS.
ARCHIBALD DOUGLAS WASS.

Witnesses:
W. H. PILMOUR,
WILLIAM DAGGETT.